(12) United States Patent
Kim et al.

(10) Patent No.: US 6,570,275 B2
(45) Date of Patent: May 27, 2003

(54) MOTOR HAVING TWO DEGREES OF FREE MOTION WITH A CORE HAVING INNER AND OUTER WINDING PORTIONS

(75) Inventors: Tae Heoung Kim, Gwangmyeong-Si (KR); Jin Soo Park, Incheon-Si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/912,374

(22) Filed: Jul. 26, 2001

(65) Prior Publication Data

US 2002/0047367 A1 Apr. 25, 2002

(30) Foreign Application Priority Data

Jul. 26, 2000 (KR) ......................... 2000-43065

(51) Int. Cl.⁷ .................. H02K 04/00; H02K 001/12
(52) U.S. Cl. .................... 310/12; 310/254; 310/179; 310/156; 310/101; 310/22; 310/15; 310/21; 310/82; 310/80
(58) Field of Search .................... 310/22, 15, 21, 310/82, 12, 80, 254, 179, 156, 101

(56) References Cited

U.S. PATENT DOCUMENTS

| | | | | |
|---|---|---|---|---|
| 3,696,251 A | * | 10/1972 | Last et al. .................... 290/53 |
| 5,331,245 A | * | 7/1994 | Burgbacher et al. ........ 310/186 |
| 5,627,418 A | * | 5/1997 | Satomi et al. ................. 310/12 |
| 6,137,195 A | * | 10/2000 | Chitayat ...................... 310/12 |
| 6,181,047 B1 | * | 1/2001 | Nitta .......................... 310/254 |
| 6,201,322 B1 | * | 3/2001 | Heine et al. ................... 310/51 |
| 6,429,611 B1 | * | 8/2002 | Li ............................... 318/115 |

\* cited by examiner

Primary Examiner—Nestor Ramirez
Assistant Examiner—H. Y. M. Elkassabgi
(74) Attorney, Agent, or Firm—Birch, Stewart, Kolasch & Birch, LLP

(57) ABSTRACT

A motor having two degrees of free motion includes: a motor casing; a combined core of cylindrical shape having a plurality of inner teeth inside and a plurality of outer teeth outside and fixedly coupled inside the motor casing; a first coil winding wound on the inner teeth of the combined core; a second coil winding coil wound on the outer teeth of the combined core; a rotating armature having a permanent magnet inside inserted inside the combined core and rotated by an interaction of a magnetic flux formed by the first coil winding and the permanent magnet; a linear armature located at one side of the second coil winding undergoing a linear movement by the flux formed by the second coil winding; a driving shaft penetratingly coupled to the rotating armature and to the linear armature and undergoing rotating and linear movements therewith; and a spring urging the linear armature away from the combined core. The motor is not only able to generate a linear reciprocating driving force and a rotating force at the same time, but is also able to generated one force between the two selectively, whereby only one motor can be used for a system which needs the linear movement and the rotating movement, and the system is constructed in a simple way because no additional motion translation device is needed.

17 Claims, 4 Drawing Sheets

US 6,570,275 B2

MOTOR HAVING TWO DEGREES OF FREE MOTION WITH A CORE HAVING INNER AND OUTER WINDING PORTIONS

BACKGROUND OF THE INVENTION

1. Field of the Invention

The present invention relates to a motor having two degrees of free motion, and particularly, to a motor having two degrees of free motion which is able to generate a linear driving force and a rotational driving force simultaneously and respectively.

2. Description of the Background Art

A motor used as a driving power source of a mechanical system is an apparatus which converts electrical energy into kinetic energy, and includes a stator and an armature. The armature of the motor is moved when electric current is applied to the motor and generates an output mechanical force.

Motors are divided into two types, that is, a rotary driving motor generating a rotational driving force and a linear motor generating a linear driving force.

FIG. 1 is a cross-sectional view showing a conventional BLDC (Brushless Direct Current) rotary motor, that is, a rotary motor generating a rotational driving force. As shown therein, the rotary motor includes a stator 2 fixed in a motor case 1 formed with a certain shape, typically cylindrical, and a rotor 3 positioned inside the stator so as to be rotatable relative thereto. The stator 2 is formed such that a coil C1 is wound on a plurality of teeth or poles(not shown) formed on a laminated core formed by laminating a plurality of iron plates. And the rotor 3 is formed with one or more permanent magnets M1 inserted into an interior part of a cylinder. In addition, a driving shaft 4 is press-fitted into the rotor 3.

The rotary motor is operated as follows. That is, when an electric current is supplied to the coil winding C1 in the stator 2, the rotor 3 is rotated by an interaction of the magnetic flux generated by the electric current in the coil winding C1 and a magnetic flux of the permanent magnet M1 of the rotor.

FIG. 2 is a cross-sectional view showing a conventional fixed coil type linear motor generating a linear driving force. As shown therein, the linear motor includes a stator 13 including an outer core 11 fixedly coupled to a motor case 10 of a certain shape, and an inner core 12 fixedly coupled inside the outer core 11 with a certain gap therebetween, and an armature 14 inserted between the outer core 11 and the inner core 12. The outer core 11 and the inner core 12 are formed as laminated bodies, and a coil C2 is wound thereon. The armature 14 is made by coupling a plurality of permanent magnets M2 on a magnet holder 15 of a cylindrical shape.

The linear motor is operated as follows. That is, when an electric current is applied to the coil winding C2, the armature 14 is linearly moved by an interaction between the magnetic flux generated by the electric current flowing in the coil winding C2 and the permanent magnet M2.

However, an additional motion translation device such as a rack or a pinion must be installed in case that a linear driving force is needed when the rotary motor is used, and similarly, an additional motion translation device should be installed, if rotating force is needed when using a linear motor. Especially, if a rotational driving force and a linear driving force are both needed, then a rotary motor and a linear motor should both be used at the same time.

SUMMARY OF THE INVENTION

Therefore, an object of the present invention is to provide a motor having two degrees of free motion which is able to generate a linear driving force and a rotational driving force, respectively, and also is able to generate a linear driving force and a rotational force at the same time.

To achieve the object of the present invention, as embodied and broadly described herein, there is provided a motor having two degrees of free motion which includes a motor casing; a combined core having a first winding unit and a second winding unit and fixedly coupled inside the motor casing; a first coil winding wound on the first winding unit of the combined core; a second coil winding wound on the second winding unit of the combined core; a rotary armature having a permanent magnet inside and rotatably provided inside the combined core; a linear armature disposed laterally of the second coil winding and linearly movable relative thereto; an elastic means urging the linear armature away from the combined core; and a driving shaft coupled to the rotating armature as penetrating the rotating armature and coupled to the linear armature as penetrating the linear armature and respectively rotatably and linearly movable thereby.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to the preferred embodiment of the present invention, examples of which are illustrated in the accompanying drawings.

Figure 1:
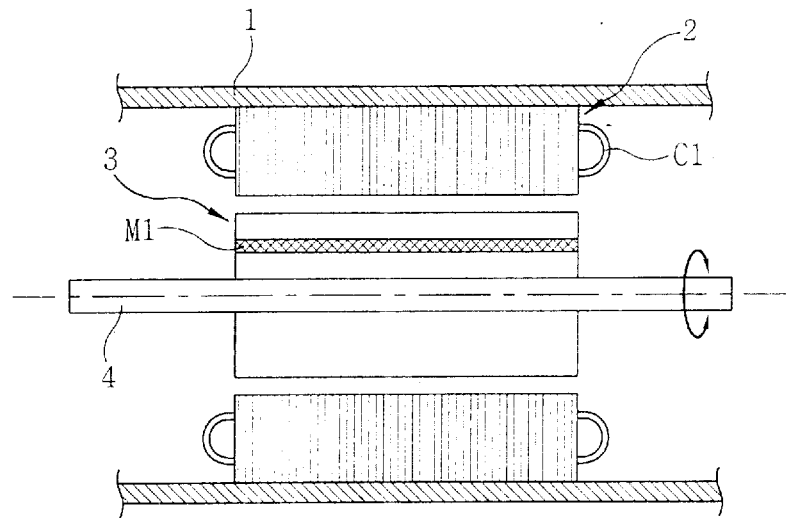
FIG. 1 a cross-sectional view showing a conventional rotary motor.
Figure 2:
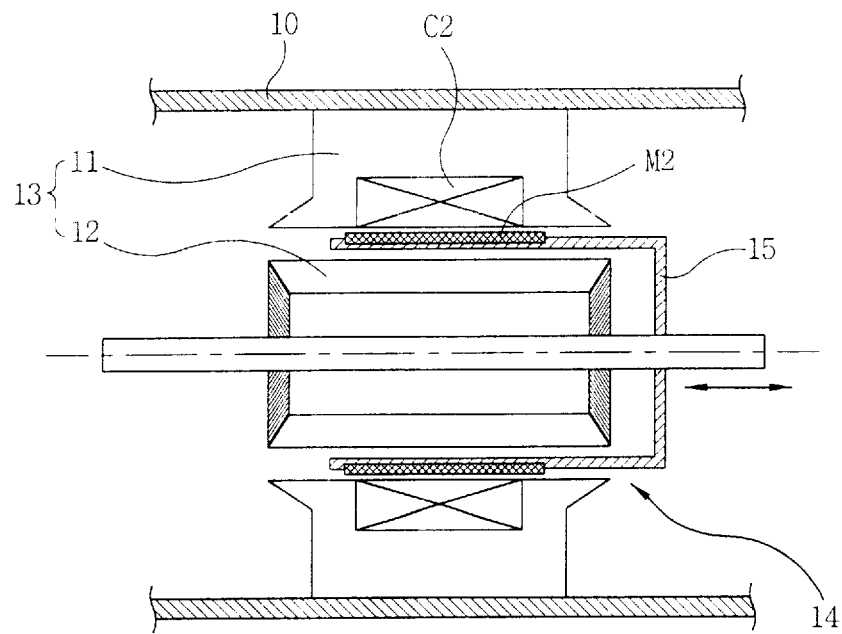
FIG. 2 is a cross-sectional view showing a conventional linear motor.
Figure 3:
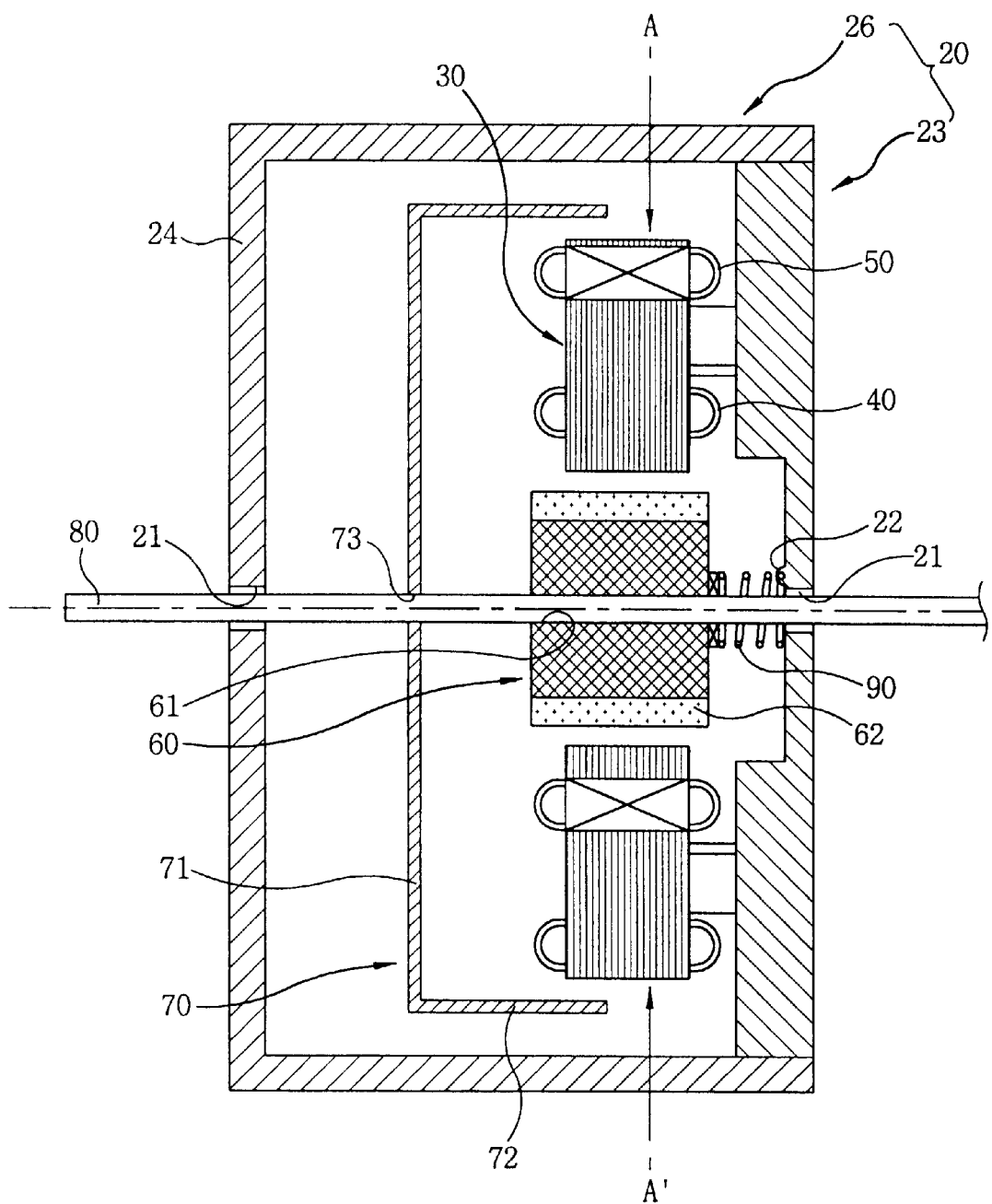
FIG. 3 is a cross-sectional view showing a motor having two degrees of free motion according to the present invention.

FIG. 3 is a cross-sectional view showing a motor having two degrees of free motion according to the present invention. As shown therein, the motor having two degrees of free motion according to the present invention includes a motor casing 20 and a combined core 30 mounted inside the motor casing 20. The motor casing 20 is divided into two parts, that is, a base plate member 23 of a certain area having a shaft insertion hole 21 through a center part thereof and retainer 22 on a peripheral part of the shaft insertion hole 21, and a cover member 26 of cylindrical shape with one end 24 thereof closed and having a shaft insertion hole 25 through a central part of the closed end 24, with the cover member 26 being coupled to the base member 23 so as to cover the base member 23.

Figure 4:
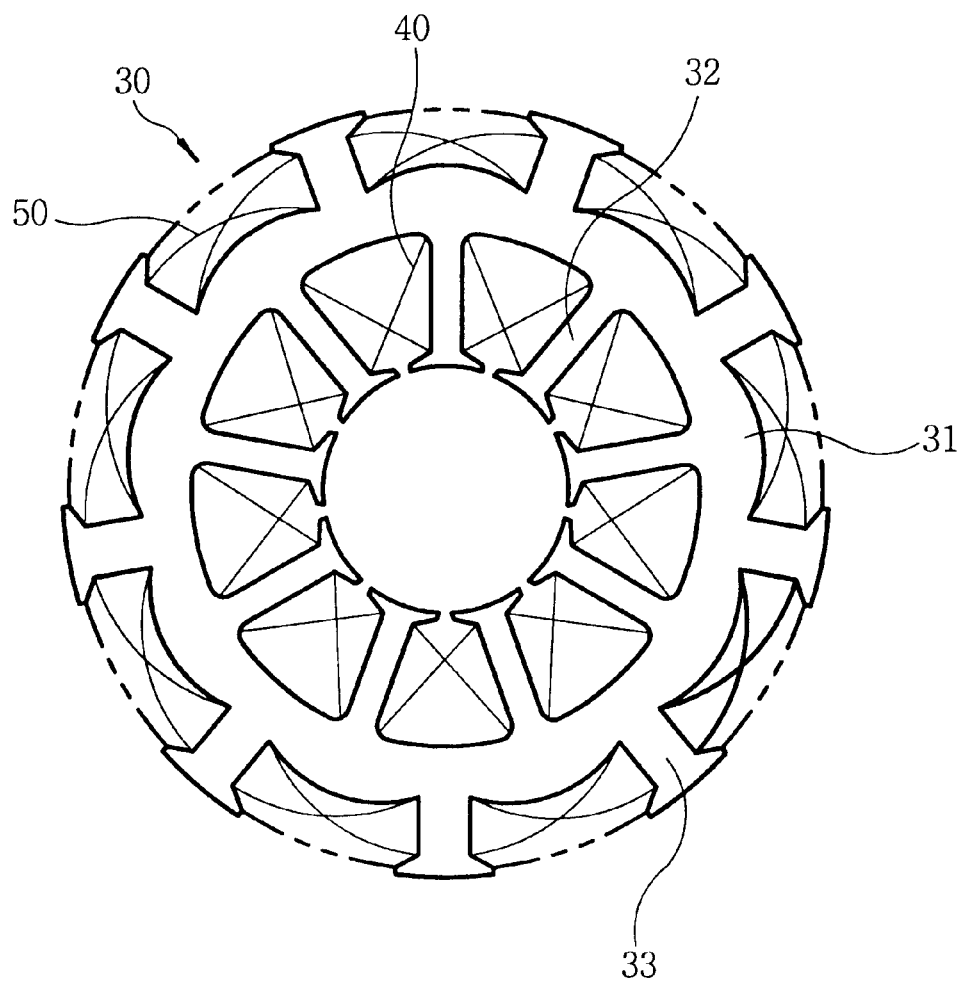
FIG. 4 is a cross-sectional view taken along the line A–A' in FIG. 3 showing a combined core constituting the motor having two degrees of free motion according to the present invention.

The combined core 30 is fixedly coupled to the base plate member 23 of the motor casing 20. As shown in FIG. 4, the combined core 30 is made such that a plurality of inner pole teeth 32 are formed on an inner circumferential wall of a cylindrical body 31 and a plurality of outer pole teeth 33 are formed on an outer circumferential wall of the cylindrical body 31. The combined core 30 is made by laminating a plurality of thin metal sheets. In addition, when a coil is wound on the inner pole teeth 32 of the combined core 30, the coil makes a first coil winding 40, and when a coil is wound on the outer pole teeth 33 of the combined core 30, then the coil makes a second coil winding 50.

A rotor or rotating armature 60 is positioned inside the combined core 30. The rotating armature 60 is formed in the shape of a cylinder having a shaft coupling hole 61 therethrough, and a permanent magnet 62 is press-fitted onto the cylinder. The rotating armature 60 is made by laminating thin metal sheets, and its axial length is longer than that of the combined core 30.

Also, a linear armature 70 is positioned at one side laterally of the second coil winding 50. The linear armature 70 includes a disk portion 71 having a larger outer diameter than that of the combined core 30, and a sleeve portion 72 of cylindrical shape extended from the peripheral edge of the disk portion 71. A shaft coupling hole 73 is formed though a center part of the disk portion 71. The linear armature 70 is so positioned as to wrap one part of the combined core 30, that is, the portion located on the cover member 26, so that the sleeve portion 72 of cylindrical shape faces to the outer circumferential surface of the combined core 30, that is, to the second coil winding 50. A front edge of the sleeve portion 72 is located so as to overlie on the outer circumferential surface of the combined core 30.

In addition, a driving shaft 80 of a certain length is press-fitted into the shaft coupling hole 61 of the rotating armature 60, and is also fixedly coupled to the shaft coupling hole 73 of the linear armature 70. The driving shaft 80 penetrates the shaft insertion holes 21 and 25 formed in the cover member 26 of the motor casing 20 and in the base plate member 23.

In addition, a spring 90 is located between the base plate member 23 of the motor casing 20 and the rotating armature 60, and one end of the spring 90 is fixed on the retainer 22 formed on the base plate member 23 in the state of being inserted over the driving shaft 80. Preferably, the spring 90 is a compressed coil spring.

Figure 5:
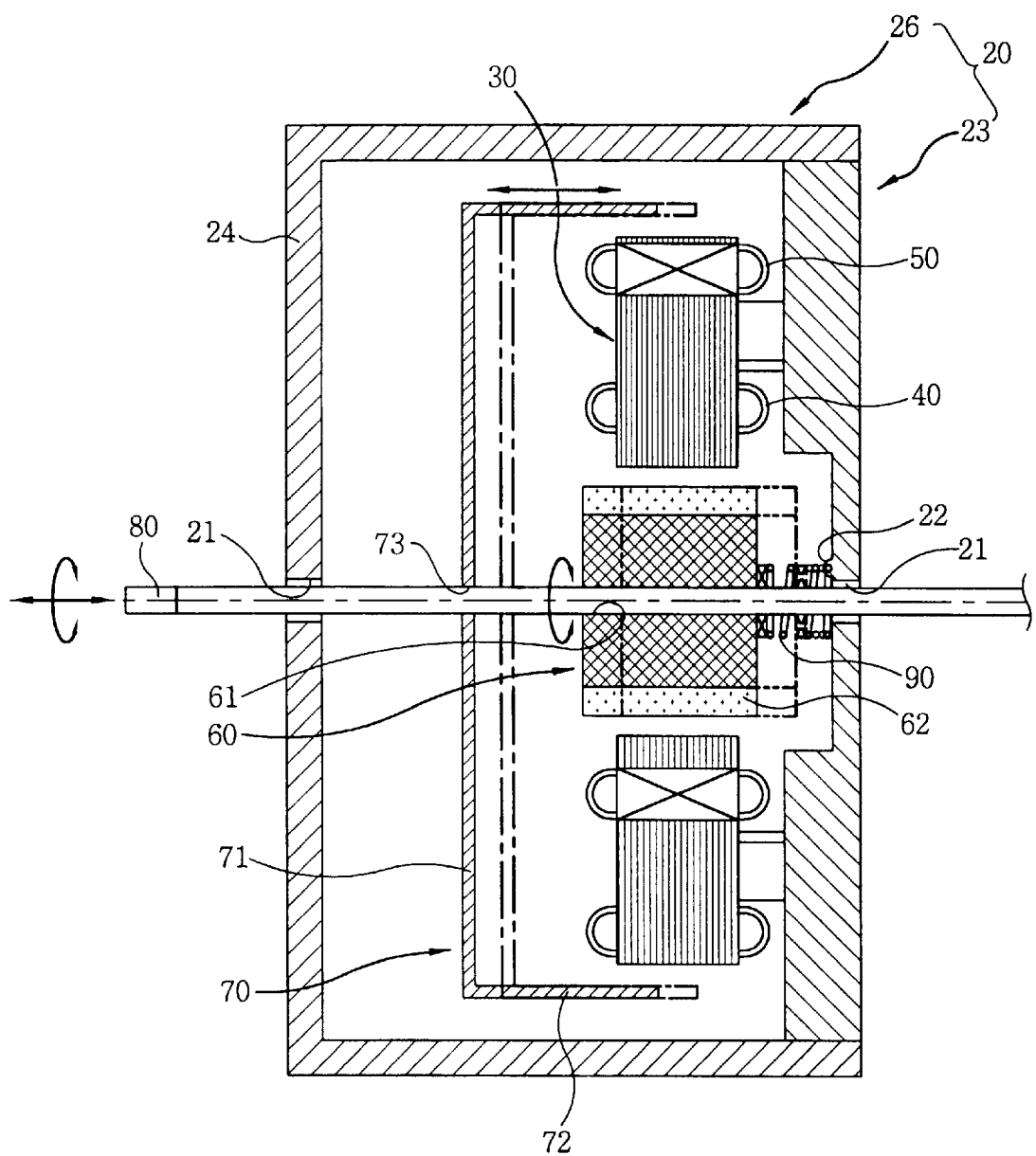
FIG. 5 is a cross-sectional view showing an operating state of the motor having two degrees of free motion according to the present invention.

Hereinafter, the operation and effect of the motor having two degrees of free motion according to the present invention will be described. As shown in FIG. 5, the magnetic fluxes generated by the permanent magnet 62 and the electric current flowing in the first coil winding 40 wound on the combined core 30, in the same way as in the conventional BLDC (Brushless Direct Current) motor, generate a rotating force according to the Fleming's left-hand law, whereby the rotating armature 60 and the driving shaft 80 coupled to the rotating armature 60 are rotated.

In addition, when an electric current flows in the second coil winding 50 to form an electromagnet, then a magnetic flux is generated and the flux attracts to the sleeve portion 72 of the linear armature 70. At that time, the linear armature 70 is moved toward where there is less magnetic resistance (to the right side in the drawing). Then, the spring is compressed. In addition, when the electric current in the second coil winding 50 is removed, the linear armature 70 returns to its original position by a restoring force of the spring 90. The linear armature 70 undergoes the linear reciprocating movements according to the processes described above, and at the same time, the driving shaft 80 coupled to the linear armature 70 also undergoes the linear reciprocating movement.

As described above, the motor having two degrees of free motion according to the present invention is not only able to generate a linear driving force and a rotating force at the same time, but is also able to generate the linear driving force and the rotating force separately. Therefore, only a single motor can be used in a system which requires a linear driving force and a rotating force at the same time, and no an additional motion translation does not need to be installed, whereby the system can be constructed simply and at a lower cost.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A motor having two degrees of free motion, comprising:
    a motor casing;
    a combined core including a first winding portion inside the core and a second winding portion outside the core fixedly coupled inside the motor casing;
    a first coil winding wound on the first winding portion of the combined core;
    a second coil winding wound on the second winding portion of the combined core;
    a rotating armature having a permanent magnet and rotatable relative the combined core;
    a linear armature located laterally of the second coil winding and linearly movable relative thereto;
    means for urging the linear armature away from the combined core; and
    a driving shaft coupled to the rotating armature and to the linear armature and undergoing rotating and linear movement therewith.

2. The motor according to claim 1, wherein the combined core is formed as a cylinder, the first winding portion is formed with a plurality of inner pole teeth formed inside the cylinder, and the second winding portion is formed with a plurality of outer teeth pole formed on an outer part of the cylinder.

3. The motor according to claim 1, wherein an axial length of the rotating armature is longer than that of the combined core.

4. The motor according to claim 1, wherein the linear armature has a cylindrical shape with one end surface thereof closed, a shaft coupling hole is formed in a center part of the closed end surface and coupled to the driving shaft, and an opposite open end part of the cylinder is located so as to overlap the combined core.

5. The motor according to claim 1, wherein the motor casing includes a base plate member of disk shape having a shaft insertion hole in a center part thereof, and a cover member of cylindrical shape with one end surface closed and having a shaft insertion hole in a center part of the closed end surface.

6. The motor according to claim 5, wherein a retainer is formed peripherally of the shaft insertion hole in the base plate member, and the means for urging is a spring coupled to the retainer and inserted over the driving shaft.

7. A motor having two degrees of free motion, comprising:
- a motor casing;
- a combined core fixedly coupled inside the motor casing including a first winding portion at an inside of the core and a second winding portion at an outside of the core;
- a first coil winding wound on the first winding portion;
- a second coil winding wound on the second winding portion;
- a rotor including a rotating armature having a permanent magnet and rotatable relative the combined core, and a linear armature located laterally of the second coil winding and linearly movable relative thereto; and
- a driving shaft coupled to the rotating armature and to the linear armature and undergoing rotating and/or linear movement therewith.

8. The motor according to claim 7, wherein the combined core is formed as a cylinder, the first winding portion is formed with a plurality of inner teeth pole formed inside the cylinder, and the second winding portion is formed with a plurality of outer teeth pole formed on an outer part of the cylinder.

9. The motor according to claim 7, wherein an axial length of the rotating armature is longer than that of the combined core.

10. The motor according to claim 7, wherein the linear armature has a cylindrical shape with one end surface thereof closed, a shaft coupling hole is formed in a center part of the closed end surface and coupled to the driving shaft, and an opposite open end part of the cylinder is located so as to overlap the combined core.

11. The motor according to claim 7, wherein the motor casing includes a base plate member of disk shape having a shaft insertion hole in a center part thereof, and a cover member of cylindrical shape with one end surface closed and having a shaft insertion hole in a center part of the closed end surface.

12. The motor according to claim 11, wherein a retainer is formed peripherally of the shaft insertion hole in the base plate member, and a spring coupled to the retainer is inserted over the driving shaft.

13. A motor having two degrees of free motion, comprising:
- a motor casing;
- a combined core including a plurality of inner teeth formed inside the core, and a plurality of an outer teeth formed on an outer part of the core, said core fixedly being coupled inside the motor casing;
- a first coil winding wound on the inner teeth;
- a second coil winding wound on the outer teeth;
- a rotor including a rotating armature having a permanent magnet and rotatable relative the combined core, and a linear armature located laterally of the second coil winding and linearly movable relative thereto; and
- a driving shaft coupled to the rotating armature and to the linear armature and undergoing rotating and/or linear movement therewith.

14. The motor according to claim 13, wherein an axial length of the rotating armature is longer than that of the combined core.

15. The motor according to claim 13, wherein the linear armature has a cylindrical shape with one end surface thereof closed, a shaft coupling hole is formed in a center part of the closed end surface and coupled to the driving shaft, and an opposite open end part of the cylinder is located so as to overlap the combined core.

16. The motor according to claim 13, wherein the motor casing includes a base plate member of disk shape having a shaft insertion hole in a center part thereof, and a cover member of cylindrical shape with one end surface closed and having a shaft insertion hole in a center part of the closed end surface.

17. The motor according to claim 16, wherein a retainer is formed peripherally of the shaft insertion hole in the base plate member, and a spring coupled to the retainer is inserted over the driving shaft.

* * * * *